(12) United States Patent
Luo

(10) Patent No.: US 9,499,148 B2
(45) Date of Patent: Nov. 22, 2016

(54) DUAL-RATE BRAKE VACUUM BOOSTER

(71) Applicant: Dongqiang Luo, Shanghai (CN)

(72) Inventor: Dongqiang Luo, Shanghai (CN)

(73) Assignee: BWI (Shanghai) Co., Ltd., Shanghai (CN)

( * ) Notice: Subject to any disclaimer, the term of this patent is extended or adjusted under 35 U.S.C. 154(b) by 348 days.

(21) Appl. No.: 14/087,098

(22) Filed: Nov. 22, 2013

(65) Prior Publication Data

US 2015/0090110 A1 Apr. 2, 2015

(51) Int. Cl.
| | |
|---|---|
| *B60T 13/575* | (2006.01) |
| *B60T 13/57* | (2006.01) |
| *F15B 21/00* | (2006.01) |
| *B60T 13/573* | (2006.01) |

(52) U.S. Cl.
CPC .............. *B60T 13/57* (2013.01); *B60T 13/573* (2013.01); *F15B 21/00* (2013.01); *B60T 13/575* (2013.01)

(58) Field of Classification Search
CPC .................................................... B60T 13/575
See application file for complete search history.

(56) References Cited

U.S. PATENT DOCUMENTS

| | | | | |
|---|---|---|---|---|
| 5,425,302 A | * | 6/1995 | Levrai | B60T 13/575 91/369.2 |
| 7,207,261 B2 | * | 4/2007 | Tsubouchi | 91/369.2 |
| 2002/0135226 A1 | * | 9/2002 | Castel | 303/114.3 |
| 2005/0166748 A1 | | 8/2005 | Schramm | |

FOREIGN PATENT DOCUMENTS

| | | |
|---|---|---|
| CN | 201249758 Y | 6/2009 |
| CN | 201380843 Y | 1/2010 |
| CN | 101844555 A | 9/2010 |
| CN | 102050101 A | 5/2011 |
| CN | 203472841 U | 3/2014 |

* cited by examiner

*Primary Examiner* — F. Daniel Lopez
(74) *Attorney, Agent, or Firm* — Dickinson Wright PLLC

(57) ABSTRACT

The present invention provides a dual-rate brake vacuum booster including a control valve body, a rubber reaction plate and a reaction rod, the rubber reaction plate being clamped between an end face of the control valve body and a base plate of the reaction rod, wherein accommodating spaces for accommodating an expansion deformation of the rubber reaction plate are respectively provided between a periphery of an end portion on one side of the rubber reaction plate and a periphery of the end face of the control valve body, and between a periphery of an end portion on the other side of the rubber reaction plate and the base plate of the reaction rod. The dual-rate brake vacuum booster prolongs the service life of the rubber reaction plate and can realize the dual-rate braking without using an additional element, thereby resulting in easy processing, simple structure and reduced cost.

5 Claims, 3 Drawing Sheets

DUAL-RATE BRAKE VACUUM BOOSTER

CROSS-REFERENCE TO RELATED APPLICATION

The subject application claims the benefit of CN 20131046057.5 filed on Sep. 30, 2013, entitled "Dual-Rate Brake Vacuum Booster".

TECHNICAL FIELD

The present invention relates to a vacuum booster, and particularly, to a dual-rate brake vacuum booster.

BACKGROUND ART

It is well known that currently, the automobile braking system usually adopts a vacuum booster to achieve the purpose of a boosting in braking. The main principle is to realize the boosting function using the pressure difference between the vacuum and atmosphere. FIGS. 1 and 2 illustrate a structure diagram of an existing vacuum booster, and an enlarged structure diagram of Part A in FIG. 1, respectively. The existing vacuum booster 100 mainly includes front and rear housing assemblies, a control valve body 101, an air valve 102, a rubber reaction plate 103, a reaction rod 104, etc. In which, the rubber reaction plate 103 is tightly clamped between the control valve body 101 and the reaction rod 104, a base plate 105 of the reaction rod 104 is closely engaged with one side of the rubber reaction plate 103, an end face of the control valve body 101 is closely engaged with the other side of the rubber reaction plate 103, so as to wholly clamp the rubber reaction plate 103. During the usage, by means of a thrust generated by different pressures in two working chambers of the vacuum booster, the braking force is amplified in proportion to achieve the braking effect. However, the above existing vacuum booster is a single-rate brake vacuum booster, and the rate is constant in the braking process. As a result, when a high deceleration rate is required (e.g., emergency braking), a large braking force shall be provided, thus the driver has to apply a larger pedal force, which increases the driver's burden, and degrades the driver's driving experience.

In addition, U.S. Patent Application Publication No. US20050166748A discloses a dual-rate brake vacuum booster, which mainly differs from the single-rate brake vacuum booster in that an accommodating space is provided at one side of the rubber reaction plate where the base plate of the reaction rod is engaged, and when bearing a large external force, the rubber reaction plate expands and fills up the accommodating space, thereby increasing the action area between the reaction rod and the rubber reaction plate, and hence varying the rate to realize a dual-rate braking. But there are also some disadvantages: the existing dual-rate brake vacuum booster only has an accommodating space between the rubber reaction plate and the base plate of the reaction rod, thus the pressed rubber reaction plate can only expand towards one side, which easily produces an over fatigue and causes a defect of shortened service life.

In view of the defects of the above-mentioned existing dual-rate brake vacuum boosters, the inventor actively makes improvements and innovations based on years of study, the on-site experiences and the professional knowledge, and in conjunction with the practical usages and the technical requirement of the structure, so as to realize a dual-rate brake vacuum booster which is capable of prolonging the service life of the rubber reaction plate.

SUMMARY OF THE INVENTION

The objective of the present invention is to provide a dual-rate brake vacuum booster which is capable of prolonging the service life of the rubber reaction plate.

In order to achieve the above objective, a dual-rate brake vacuum booster comprises a control valve body, a rubber reaction plate and a reaction rod, the rubber reaction plate being clamped between an end face of the control valve body and a base plate of the reaction rod, wherein accommodating spaces for accommodating an expansion deformation of the rubber reaction plate are respectively provided between a periphery of an end portion on one side of the rubber reaction plate and a periphery of an end face of the control valve body, and between a periphery of an end portion on the other side of the rubber reaction plate and the base plate of the reaction rod.

The dual-rate brake vacuum booster as mentioned above, wherein a cross-section of the accommodating space between the end portion of the rubber reaction plate and the base plate of the reaction rod is triangular or quadrangular.

The dual-rate brake vacuum booster as mentioned above, wherein a cross-section of the accommodating space between the end portion of the rubber reaction plate and the end face of the control valve body is quadrangular.

The dual-rate brake vacuum booster as mentioned above, wherein the accommodating space between the end portion of the rubber reaction plate and the base plate of the reaction rod is cut on the base plate of the reaction rod.

The dual-rate brake vacuum booster as mentioned above, wherein the accommodating space between the end portion of the rubber reaction plate and the end face of the control valve body is cut on the end face of the control valve body.

As compared with the prior art, the present invention has the following characteristics and advantages.

1. The present invention provides an accommodating space at the end portion on each side of the rubber reaction plate, and the rubber reaction plate can simultaneously expand towards the accommodating space at each side, which promotes the rubber reaction plate to release the pressure uniformly to protect the rubber reaction plate, thereby prolonging the service life of the rubber reaction plate.

2. In addition, the present invention can realize the dual-rate braking without using any additional element, thereby having the advantages of easy processing, simple structure and reduced cost.

BRIEF DESCRIPTION OF THE DRAWINGS

The drawings described herein are only adopted for the purpose of explanation, rather than intending to limit the scope of the disclosure of the present invention in any way. In addition, the shapes and scales of the parts in the drawings are just schematic to promote the understanding of the present invention, rather than specifically defining the shapes and scales of the parts in the present invention. Being taught by the present invention, a person skilled in the art can implement the present invention by selecting various possible shapes and scales according to the actual conditions.

DETAILED DESCRIPTION OF THE EMBODIMENTS

The details of the present invention can be understood more clearly with reference to the drawings and the descriptions of the embodiments of the present invention. However, the embodiments of the present invention described herein are just adopted for the purpose of explaining the present invention, rather than limiting the present invention in any way. Being taught by the present invention, a person skilled in the art can conceive of any possible modification based on the present invention, which shall be deemed as falling within the scope of the present invention.

Figure 1:
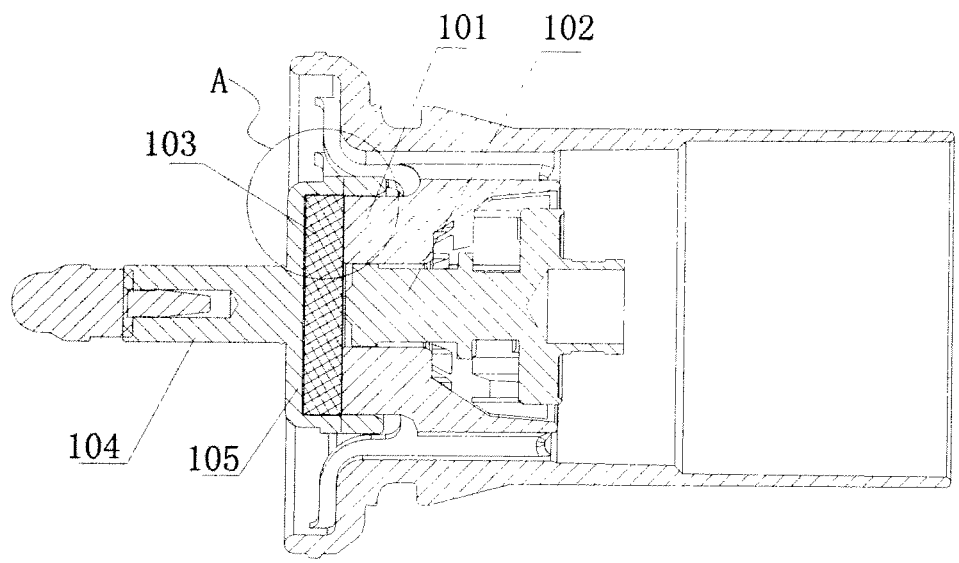
FIG. 1 is a cross-sectional structure diagram of an existing vacuum booster.
Figure 2:
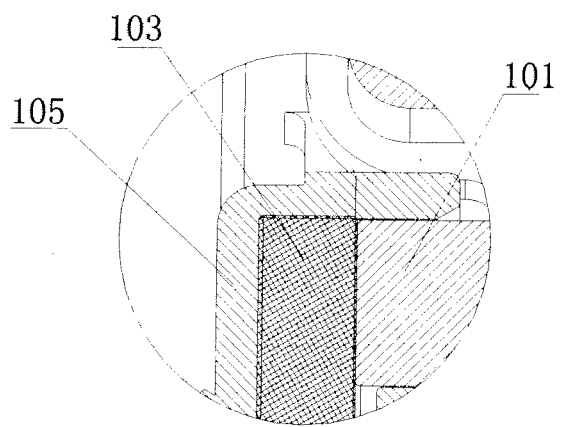
FIG. 2 is an enlarged structure diagram of Part A in FIG. 1.
Figure 3:
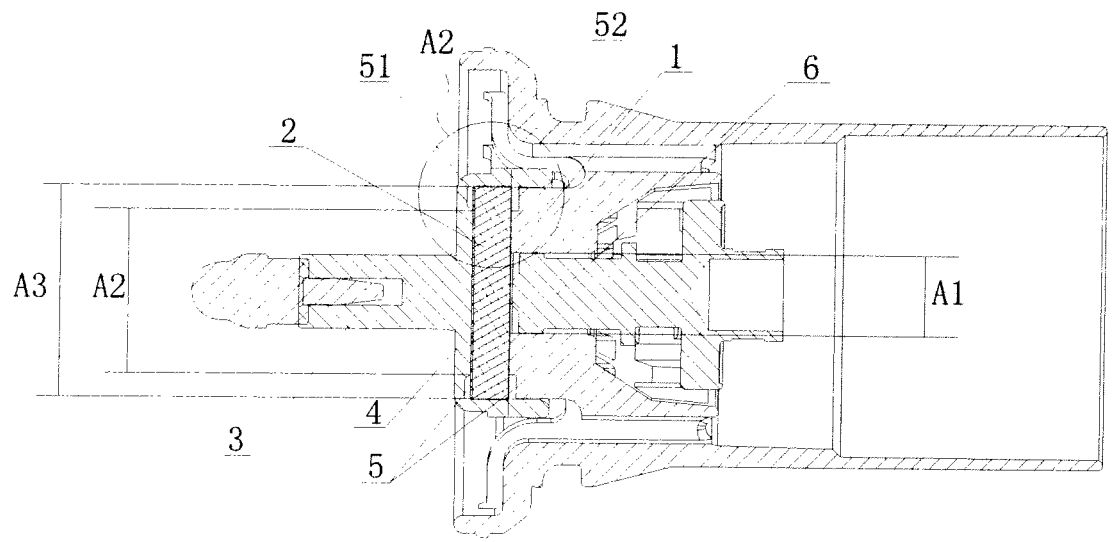
FIG. 3 is a cross-sectional structure diagram of a dual-rate brake vacuum booster according to an embodiment of the present invention.
Figure 4:
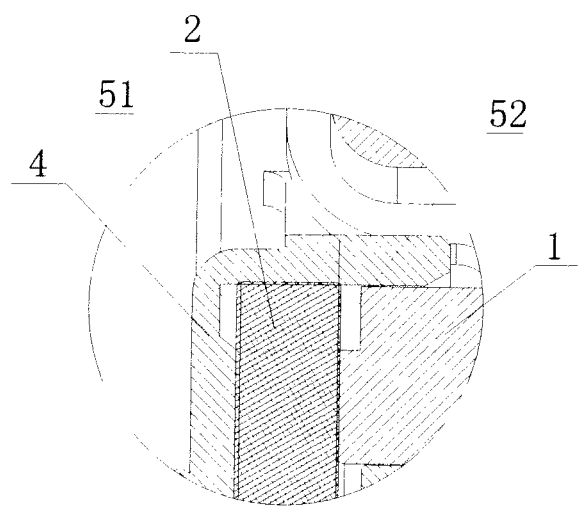
FIG. 4 is an enlarged structure diagram of Part A2 in FIG. 3.
Figure 5:
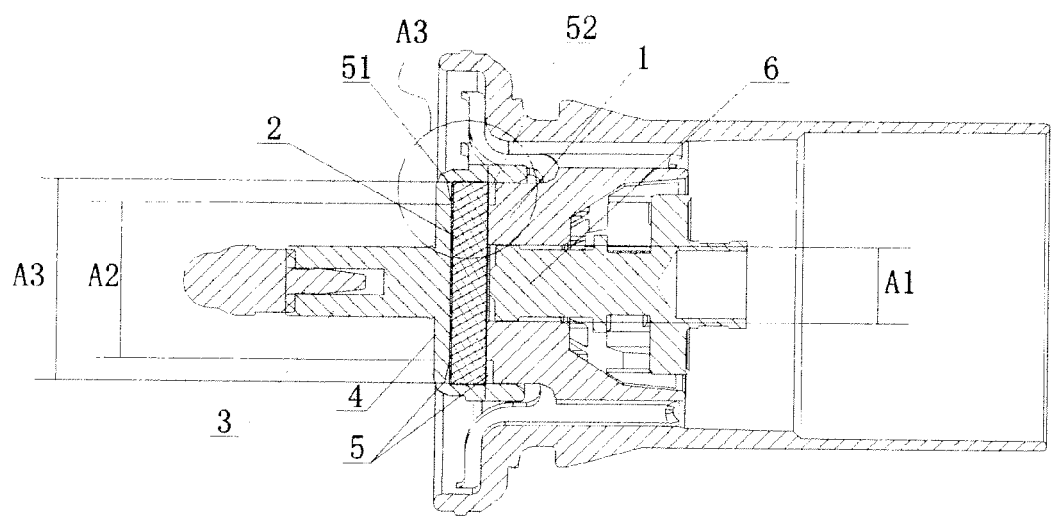
FIG. 5 is a cross-sectional structure diagram of a dual-rate brake vacuum booster according to a second embodiment of the present invention.

Referring to FIGS. 3 to 6, which illustrate a cross-sectional structure diagram of a dual-rate brake vacuum booster according to an embodiment of the present invention; an enlarged structure diagram of Part A2 in FIG. 3; a cross-sectional structure diagram of a dual-rate brake vacuum booster according to a second embodiment of the present invention; and an enlarged structure diagram of Part A3 in FIG. 5, respectively.

As illustrated in FIGS. 3 and 4, a dual-rate brake vacuum booster proposed in the present invention at least comprises a control valve body 1, a rubber reaction plate 2 and a reaction rod 3, wherein the rubber reaction plate 2 is clamped between an end face of the control valve body 1 and a base plate 4 of the reaction rod 3, and accommodating spaces 5 for accommodating the expansion deformation of the rubber reaction plate 2 are respectively provided between a periphery of an end portion on one side of the rubber reaction plate 2 and a periphery of the end face of the control valve body 1, and between a periphery of an end portion on the other side of the rubber reaction plate 2 and the base plate 4 of the reaction rod 3. That is, a first accommodating space 51 is provided between an end portion on one side of the rubber reaction plate 2 and the end face of the control valve body 1, and a second accommodating space 52 is provided between an end portion on the other side of the rubber reaction plate 2 and the base plate 4 of the reaction rod 3. Thus when the rubber reaction plate 2 is pressurized, it expands to fill up the accommodating spaces 51 and 52, thereby increasing the action area between the base plate 4 of the reaction rod 3 and the rubber reaction plate 2, thus varying the rate and realizing the dual-rate braking. As compared with the existing dual-rate braking booster, the present invention provides the accommodating spaces 51, 52 at the end portion on each side of the rubber reaction plate 2, and the rubber reaction plate 2 can simultaneously expand towards the accommodating spaces 51, 52 at each side, which promotes the rubber reaction plate 2 to release the pressure uniformly to protect the rubber reaction plate 2, thereby prolonging the service life of the rubber reaction plate 2.

Further, as illustrated in FIGS. 3 to 6, in the present invention, the first accommodating space 51 is cut on a surface of the base plate 4 of the reaction rod 3 opposing to the end portion of the rubber reaction plate 2, and the second accommodating space 52 is cut on a surface of the end face of the control valve body 1 opposing to the end portion of the rubber reaction plate 2.

Figure 6:
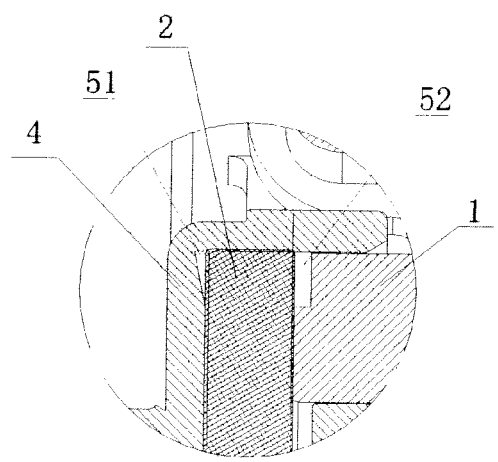
FIG. 6 is an enlarged structure diagram of Part A3 in FIG. 5.

Further, as illustrated in FIGS. 3 to 6, a cross-section of the second accommodating space 52 is a quadrangle. As illustrated in FIGS. 3 and 4, in an optional embodiment of the present invention, a cross-section of the first accommodating space 51 is a quadrangle, and preferably, the bottom side of the quadrangle is inclined downwards towards the rubber reaction plate 2 side. As illustrated in FIGS. 5 and 6, in another optional embodiment of the present invention, the first accommodating space 51 is an inverted cone, i.e., a cross-section of which is a triangle. Since the triangular cross-section has a slope, the rubber is easier to flow, which further improves the durability of the rubber reaction plate.

During the usage of the present invention, when the driver's pedal force is smaller, the rubber reaction plate 2 produces a smaller elastic deformation while being pressed by an air valve and the reaction rod 3. In that case, the rate I=A2/A1 (as illustrated in FIGS. 3 and 5, wherein A1 is a contact area between the air valve 6 and the rubber reaction plate 2, A2 is a contact area between the base plate 4 of the reaction rod and the rubber reaction plate 2 before the rubber reaction plate 2 fills up the accommodating space 51, 52 by expansion). When the driver's pedal force is larger, the rubber reaction plate 2 expands to fill up the accommodating spaces 51, 52, thereby increasing the action area between the base plate 4 of the reaction rod and the rubber reaction plate 2, and hence varying the rate. In that case, the rate I=A3/A1 (as illustrated in FIGS. 3 and 5, wherein A3 is a contact area between the base plate 4 of the reaction rod and the rubber reaction plate 2 after the rubber reaction plate 2 fills up the accommodating spaces 51, 52 by expansion), thus the vacuum booster realizes the function of dual-rate braking. The present invention provides the accommodating spaces 51, 52 at the end portion on each side of the rubber reaction plate 2, and the rubber reaction plate 2 can simultaneously expand towards the accommodating spaces 51, 52 at each side, which promotes the rubber reaction plate 2 to release the pressure uniformly to protect the rubber reaction plate 2, thereby prolonging the service life of the rubber reaction plate 2. In addition, the present invention can realize the dual-rate braking without using any additional element, thereby having the advantages of easy processing, simple structure and reduced cost.

In addition, for the dual-rate brake vacuum booster of the present invention, an accommodating space for accommodating an expansion deformation of the rubber reaction plate 2 can be only provided between the periphery of the end portion of the rubber reaction plate 2 and the periphery of the end face of the control valve body 1, so as to realize the function of dual-rate braking.

The detailed descriptions of the above embodiments are just made for the purpose of explaining the present invention, so that the present invention can be understood better. However, those descriptions cannot be construed as limitations to the present invention in any reason. In particular, the features described in different embodiments can be randomly combined with each other to constitute other embodiments. Unless otherwise specified explicitly, those features shall be deemed as being applicable to any embodiment, rather than being limited to the described embodiments.

I claim:

1. A dual-rate brake vacuum booster comprising: a control valve body, a rubber reaction plate, and a reaction rod, the rubber reaction plate being clamped between an end face of the control valve body and a base plate of the reaction rod, characterized in that, accommodating spaces for accommodating an expansion deformation of the rubber reaction plate are respectively provided between a periphery of an end portion on one side of the rubber reaction plate and a periphery of the end face of the control valve body, and between the periphery of the end portion on the other side of the rubber reaction plate and the base plate of the reaction rod, wherein a cross-section of the accommodating space between the periphery of the end portion of the rubber reaction plate and the base plate of the reaction rod is triangular.

2. The dual-rate brake vacuum booster according to claim 1, wherein a cross-section of the accommodating space between the end portion of the rubber reaction plate and the end face of the control valve body is quadrangular.

3. The dual-rate brake vacuum booster according to claim 1, wherein the accommodating space between the end portion of the rubber reaction plate and the base plate of the reaction rod is cut on the base plate of the reaction rod.

4. The dual-rate brake vacuum booster according to claim 1, wherein the accommodating space between the end portion of the rubber reaction plate and the end face of the control valve body is cut on the end face of the control valve body.

5. A dual-rate brake vacuum booster comprising:
   a control valve body having an end face;
   a reaction rod having a base plate;
   a reaction plate of rubber material extending between a first side and a second side and presenting an end portion between said first and second sides;
   said reaction plate clamped between said control valve body and said reaction rod with said first side of said reaction plate disposed against said end face of said control valve body and said second side of said reaction plate disposed against said base plate of said reaction rod;
   said end face of said control valve body defining a first accommodating indentation adjacent to said end portion of said reaction plate for accommodating expansion deformation of said reaction plate;
   said base plate of said reaction rod defining a second accommodating indentation adjacent to said end portion of said reaction plate for accommodating expansion deformation of said reaction plate; and
   wherein a cross-section of the accommodating indentation defined by said base plate of said reaction rod is triangular.

* * * * *